United States Patent [19]

Zägelein et al.

[11] Patent Number: 4,779,075
[45] Date of Patent: Oct. 18, 1988

[54] DEVICE FOR ABSOLUTE DISPLACEMENT DETERMINATION

[75] Inventors: Walter Zägelein, Rosstal; Dieter Rechinger, Nürnberg, both of Fed. Rep. of Germany

[73] Assignee: Siemens Aktiengesellschaft, Berlin and Munich, Fed. Rep. of Germany

[21] Appl. No.: 938,505

[22] Filed: Dec. 5, 1986

[30] Foreign Application Priority Data

Dec. 16, 1985 [DE] Fed. Rep. of Germany ....... 3544452

[51] Int. Cl.⁴ .............................................. G08C 19/16
[52] U.S. Cl. ........................... 340/870.18; 340/870.19; 340/870.20; 340/870.31; 324/165; 324/207; 324/208
[58] Field of Search ...................... 340/870.18, 870.19, 340/870.20, 870.31; 324/208, 165, 173-175, 207, 260, 262

[56] References Cited

U.S. PATENT DOCUMENTS

| 4,167,680 | 9/1979 | Gross ................................... 340/333 |
| 4,466,189 | 8/1984 | Tobin, Jr. ............................ 324/208 |
| 4,486,845 | 12/1984 | Duckworth ................... 340/870.18 |
| 4,618,857 | 10/1986 | Dubois et al. ....................... 340/333 |

OTHER PUBLICATIONS

Theorie und Praxis der Weigand-Sensoren; Von Kuens; Der Konstruckteuk Jan., Feb. & Mar. 1983 Verlag fur Technik und Wirtschaft, Wies Baden.

Primary Examiner—John W. Caldwell, Sr.
Assistant Examiner—Tyrone Queen
Attorney, Agent, or Firm—Kenyon & Kenyon

[57] ABSTRACT

To make possible a technically uncomplicated and reliable absolute displacement determination—in particular for the position determination of robot drives—a cyclic position transmitter (L) and a revolution transmitter (U) rigidly coupled therewith are provided, the sum signal of which indicates the displacement. As revolution transmitter there is used a transmitter (U) which makes use of the Wiegend effect.

6 Claims, 1 Drawing Sheet

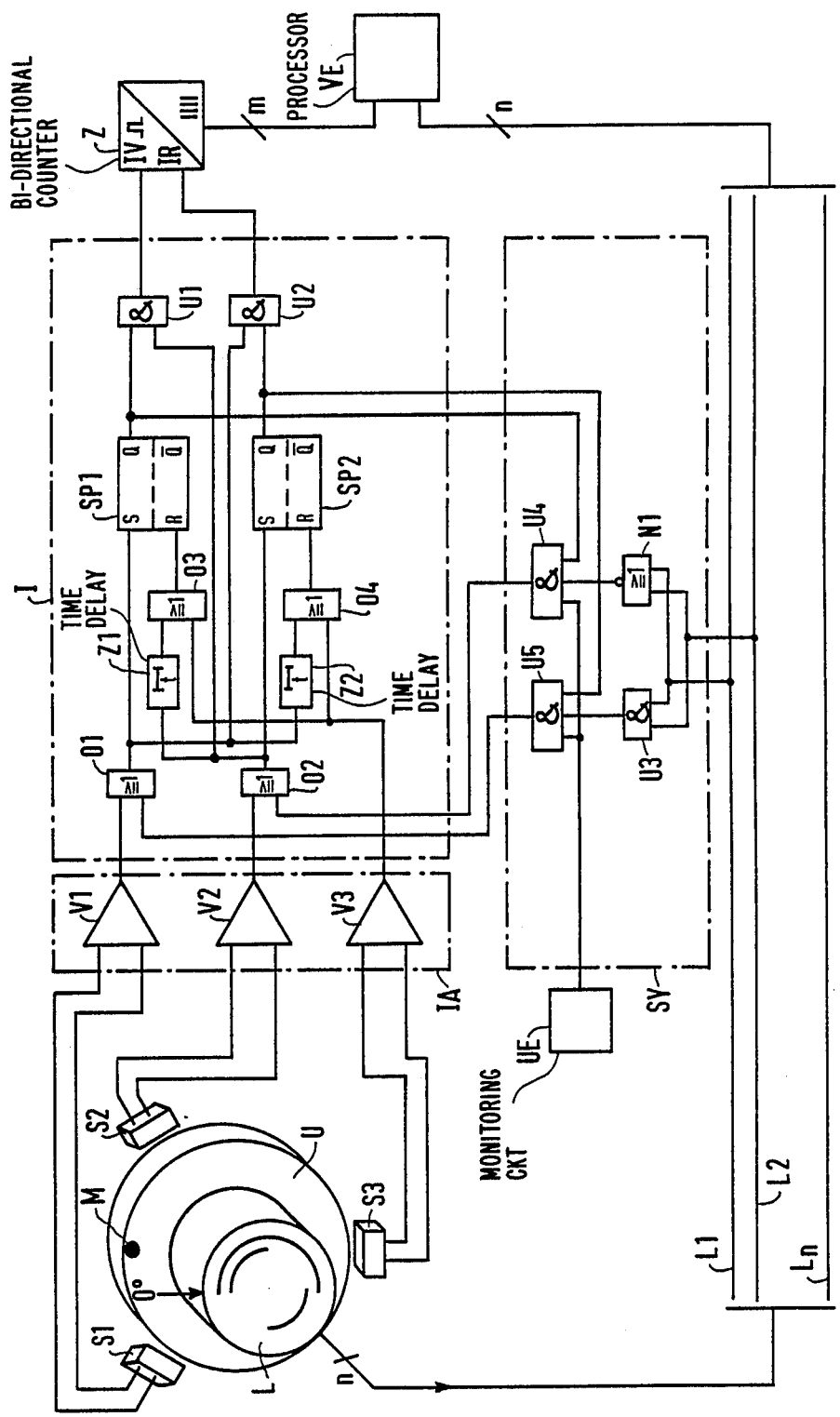

DEVICE FOR ABSOLUTE DISPLACEMENT DETERMINATION

BACKGROUND OF THE INVENTION/FIELD OF INVENTION

The invention relates to a device for absolute displacement determination having a position transmitter, which over a given path, executes a plurality of revolutions, the position transmitter delivering in each instance a position signal corresponding to its angular position.

DESCRIPTION OF THE PRIOR ART

Commercial devices, e.g., synchros, permit only a cyclic absolute displacement determination. But since in case of failure of the transmitter voltage and intermittent position change, false measurements may occur, which might result in false operations especially when these devices are employed in robot technology, in critical safety-fields general absolute displacement transmitters should be used. These devices, however, are relatively complicated and hence trouble prone. Furthermore, such devices require close proximity between the transmitters and electrical components in which dissipation is critical. While conventional absolute displacement transmitters have a temperature deficient performance, in modern motors, relatively high operating temperatures are provided for optimum design.

SUMMARY OF THE INVENTION

It is the object of the invention to design a device for absolute displacement determination in which the full measured distance is possible in a reliable and technically uncomplicated manner.

According to the invention, the position transmitter is rigidly coupled with a revolution transmitter which delivers per revolution a number of voltage pulses whose amplitude is independent of velocity. The number of revolutions is superimposed by a processor with a fractional rotatable position to obtain an absolute displacement. The voltage pulses may be generated for example by using the Wiegand effect or the Large-Barkhausen discontinuity.

A revolution transmitter which makes use of the Wiegand effect is described in "Der Konstrukteur" January/Feburary, March 1983; Verlag fur Technik und Wirtschaft: Wiesbaden: "Theory and Practice of Wiegand Sensors" FIG. 12b. The advantage of such sensors is that they furnish, without a separate current supply, a voltage pulse whose amplitude, in contrast to that of an inductive transducers, is independent of the relative velocity between a fixed and a moving part of the measuring system. Also the sensors are usable within a very large temperature range, have a high signal-to-noise ratio and have outputs which are short-circuit proof. In the arrangement of the magnet, Wiegand wire and respective coil of such a system, the Wiegand wire may be movable and the magnet with the sensor coil fixed, or the arrangement may consist of a movable magnet and fixed Wiegand wire with respective coil.

Since with a single sensor there exists a switching uncertainty and also a switching hysteresis, an arrangement of several sensors disposed around the circumference of the revolution transmitter is found to be advantageous. According to an advantageous embodiment of the invention, the revolution transmitter is able, during each revolution, to trigger a voltage pulse in three sensors distributed over the circumference of the revolution transmitter, so that after one of the sensors, designated as a reference basis sensor, the other two sensors follow clockwise as a first sensor and a second sensor for evaluating the signals associated with the voltage surges. Two memory elements of a pulse evaluating circuit are provided, which memory elements have a reset state when a voltage pulse is generated by the reference sensor. If a voltage surge is generated by the first sensor, the first memory element is changed to a set or operating state, while the second memory element is reset. When the second memory is set, a revolution signal indicating counterclockwise rotation is triggered. If a voltage pulse is generated by the second sensor, the second memory element is set, while the first memory element is reset. When the first memory element is set, a revolution signal indicating clockwise rotation is triggered.

The revolution signals are fed to an up/down counter which indicates the cast or number of full revolutions within the respective absolute displacement.

Due to a voltage pulse generated by the first sensor which resets the second memory element after a preselected time delay, it is assured that no undesirable signals occur while the memory elements change state.

In another advantageous embodiment of the invention, the first sensor is arranged in a first, and the second sensor in a second sector of a revolution, which sectors are directly contiguous to each other and which are detectable by the position transmitter, by first and second identifying signals respectively. In the presence of the first identifying signal, the first memory is set and a revolution signal indicating counterclockwise rotation is triggered, and the second memory is reset. In the presence of the second identifying signal, the second memory is set and a revolution signal indicating clockwise rotation is triggered, and the first memory is settable to its basic position. Thereby a simple synchronization of the position transmitter and revolution transmitter is obtained.

It has been found that preferably resetting a memory should be time delayed, in order that a change of state in the memory elements will not lead to signal interference.

Furthermore, an identifying signal is triggered always only with a proper supply voltage for the position transmitter, the aforesaid synchronization occurring only at proper operation of the position transmitter.

In another advantageous embodiment of the invention, the voltage supply for the preparation, processing and counting of the voltage pulses by the sensors is uninterruptible. Such an uninterruptible voltage supply is relatively easy to realize because the devices required therefor can be accommodated separated from the location of the sensors, where the initially described harsh environmental conditions prevail, in particular thermal stress. Thus, for example, battery buffering is readily available.

BRIEF DESCRIPTION OF THE DRAWINGS

A preferred embodiment of the invention is illustrated in the drawing and is explained more specifically in the following.

DETAILED DESCRIPTION OF THE INVENTION

The drawing shown in the form of a block diagram a position transmitter L and a revolution transmitter U, which are rigidly coupled mechanically. The position transmitter L may be for example, an optical tachogenerator which has a plurality of binary-coded optically readable tracks, of which symbolically, the two most significant tracks are shown.

The first track indicates an angular position within range 0° (indicated by an arrow) to 180° by a binary signal logic "0". From 180° to 360° the track indicates a binary signal "1". The second track indicates from 0° to 90° a signal logic "0" and from 90° to 180° a signal logic "1", from 180° to 270° a signal logic "0" and from 270° to 360° a signal logic "1".

The output signals of all tracks, in the embodiment (for instance n), are connected by n lines L1 to Ln to a processor VE, as shown in the lower portion of the FIGURE.

The revolution transmitter U comprises a disk to which is attached a magnet M, which during each revolution sweeps past three sensors S1, S2 and S3, and as it passes each of the sensors S1, S2, S3, it triggers therein a voltage pulse, independently of its velocity, generated by the Wiegand effect. The voltage pulses in the sensors S1, S2 and S3, are sent over respective lines to amplifier circuits V1, V2 and V3 of a pulse processing circuit IA.

The pulse processing circuit IA is connected to a pulse evaluation circuit I, which serves to trigger a revolution signal corresponding to pulses obtained from pulse processing circuit IA, which is indicative of the direction of revolution of transmitter U. The pulse evaluation circuit I, whose function will be discussed below, is connected to a bidirectional or up/down counter Z which has an up-count input IV and a down-count input IR. On the output side, the counter supplies a bit which comprises a signal representing the reading of the counter Z to the processor VE, which forms from this incremental revolution signal and from the respective relevant position signal, the absolute current displacement. For this purpose, counter Z receives at input IV with a pulse n signal for each clockwise revolution, and at input IR a signal for counterclockwise direction.

The pulse evaluating circuit I comprises two memory elements or flip-flops SP1 and SP2 which, in the presence of a pulse from pulse processing circuit IA triggered by the voltage pulse in sensor S3 (the reference sensor), are reset. More particularly, the output of the amplifier circuit V3 is connected via an OR gate 03 to the reset input of the memory element SP1 and via an OR gate 04 to the reset input of the memory element SP2.

If during a clockwise rotation the voltage pulse from third sensor S3 is followed by a voltage pulse from the first sensor S1, then a pulse at the output of the amplifier circuit V1 is sent via an OR gate 01 to the set input of the first memory element SP1, consequently setting it, and which further resets (after a preset delay) the second memory element SP2 via a time delay element Z2 and OR gate 04.

Under these conditions, the memory element SP1 activates the up-count input of the counter indicating revolution by the sensor S2. However, resetting the memory element SP2 does not activate the down-count input of counter Z as described more fully below.

When, during a further clockwise movement of the revolution, transmitter U the magnet M influences the sensor S2, a pulse accordingly triggered by the amplifier circuit V2 is supplied via the OR gate 02 to one input of an AND gate U1, with a second input connected to the output of the memory element SP1. Since the memory element SP1 had previously been set by sensor S1 and consequently a logic level "1" is present at the output of the memory element SP1, an up-count pulse for the input IV of counter Z is triggered by the AND gate U1.

The sensor S2, however, sets at the time, via an OR gate 02. The memory element SP2, and through a time delay element Z1 via the OR gate 03 resets the memory element SP1. The resetting of the memory element SP1 eliminates the effects of spurious pulses from sensor S2, for example, due to an oscillation so that no additional signals are transmitted to counter Z. When the memory element SP2 is set, it indicates a reversal of the direction of rotation and thereafter the sensor S1 is activated generating a generation of a down-count pulse.

A down-count pulse is triggered whenever a signal logic "1" is present at the output of the memory element SP2 and the sensor S1 is activated. Then the respective down-count pulse is triggered through the OR gate 01 as well as an AND gate U2.

In addition to the pulse processing circuit IA and the pulse evaluating circuit I, a synchronization circuit SY is provided, in which the logic signal states on lines L1 and L2 represent the respective input quantities.

Logic levels "1" on both lines L1 and L2, it is indicated that the position transmitter L is in a first sector from 270° to 360°, in which sensor S1 of the revolution transmitter U is disposed. Under these conditions, an AND gate U3 connected to the lines L1 and L2 generates a first identifying signal.

If a signal logic "0" is present on each of the lines L1 and L2, this indicates that the position transmitter L sweeps the angle range 0° to 90°, which also contains the sensor S2. A NOR gate N1 connected to the lines L1 and L2 will then generate at its output a second identifying signal.

The first and second identifying signals are sent to AND gates U4, U5, which also receive a third identifying signal which is generated by a monitoring circuit UE, which monitors the power supply to the position transmitter circuits. The third identifying signal indicates that the power supply to the position transmitter operates in a preselected range. The AND gates U4 and U5 each have a third input for a fourth and a fifth identifying signal. The fourth identifying signal is the output signal of the memory SP1 indicating an upward count. The fifth identifying signal is the output signal of the memory SP2 indicating a downward count.

If at the output of the AND gate 4 a signal logic "1" is present, the memory element SP2 is set via the OR gate 02 and at the same time an up-count pulse is triggered via the AND gate U1 and the memory element SP1 is reset through time delayed element Z1. When at the output of the gate 7, a signal logic "1" is present, the memory element SP1 is set via the OR element 01 and at the same time a down-count pulse is triggered via the AND gate U2 and the memory element SP2 is reset via time delay Z2.

What is claimed is:

1. A device for determining absolute displacement comprising:

a revolution transmitter for generating a revolution signal including a predetermined number of voltage pulses having amplitudes independent of a velocity of rotation of said revolution transmitter, said revolution transmitter including signal generating means for generating said voltage pulses by making use of a Weingand or Large-Barkhausen effect;

said revolution transmitter comprising a first sensor means, a second sensor means and a reference sensor means for generating corresponding first, second and reference pulses; a pulse evaluating circuit receiving said first, second and reference pulses and including first and second memory elements, each having a set and a reset state, said memory elements being reset by said reference signal, said first memory element being set by said first pulse to indicate a counterclockwise rotation, and said second memory element being set by said second pulse to indicate a clockwise rotation, and counting means including an up/down counter having an up-count input coupled to said first memory element and a down-count input connected to said second memory element for indicating a current number of full revolutions corresponding to a respective absolute displacement;

a position transmitter rigidly coupled to said revolution transmitter which executes a plurality of revolutions over a given path for generating in each instance a position signal corresponding to its angular position, said position signal being generated independently of said revolution signal; and means for superimposing said revolution and position signals.

2. The device of claim 1 further comprising first time delay means for resetting said second memory element by said first pulse, and a second time delay means for resetting said first memory element by said second pulse, after a preset time delay.

3. The device of claim 1 wherein said first and second sensor means are disposed in corresponding first and second adjacent sectors for generating a first identifying signal when a reference point (M) on said revolution transmitter is disposed in said first sector and a second identifying signal when said reference point is disposed in said second sector, said first and second memory elements being set respectively by said first and second identifying signals.

4. The device of claim 3 wherein said first and second identifying signals are time-delayed by said second and first time delay means respectively to reset said second and first memory elements respectively.

5. The device of claim 3 further comprising supply voltage monitoring means for monitoring supply voltage for said position transmitter, said monitoring means generating a monitor signal when said supply voltage is at a preset level, said first and second identifying signals being generated only upon the presence of said monitor signals.

6. The device of claim 1 further comprising an uninterruptable power supply for providing power to said position transmitter, said revolution transmitter and said counting means.

* * * * *